US006802482B2

(12) United States Patent
Harris

(10) Patent No.: US 6,802,482 B2
(45) Date of Patent: Oct. 12, 2004

(54) OVERBOOT FOR A BI-POD ADAPTER

(76) Inventor: Gerald Harris, Rte. 1, Box 33, Barlow, KY (US) 42024

( * ) Notice: Subject to any disclaimer, the term of this patent is extended or adjusted under 35 U.S.C. 154(b) by 0 days.

(21) Appl. No.: 10/074,868

(22) Filed: Oct. 25, 2001

(65) Prior Publication Data

US 2002/0074467 A1 Jun. 20, 2002

Related U.S. Application Data

(63) Continuation of application No. 09/094,284, filed on Jun. 9, 1998, now abandoned.

(51) Int. Cl.$^7$ .............................. A47B 91/00; A61H 3/02
(52) U.S. Cl. ...................... 248/188.9; 248/357; 135/77; 135/86
(58) Field of Search .............................. 248/188.9, 357; 135/77, 78, 79, 80, 81, 84, 86; 403/289, 290; 16/30, 42 R; 42/94; 182/108

(56) References Cited

U.S. PATENT DOCUMENTS

| | | | | |
|---|---|---|---|---|
| 612,685 A | * | 10/1898 | Thorp | 15/145 |
| 624,207 A | * | 5/1899 | Hawley, Jr. | 135/84 |
| 840,892 A | * | 1/1907 | Adam | 168/1 |
| 960,700 A | * | 6/1910 | Pratt | 135/84 |
| 1,406,453 A | * | 2/1922 | Fanning | 135/82 |
| 2,447,080 A | * | 8/1948 | Meier | 135/86 |
| 2,799,287 A | * | 7/1957 | Wagner | 135/77 |
| 2,904,128 A | * | 9/1959 | Boham et al. | 150/154 |
| 3,445,082 A | * | 5/1969 | Proctor et al. | 248/183.3 |
| 4,027,687 A | * | 6/1977 | McGowan | 135/66 |
| 4,470,216 A | * | 9/1984 | Harris | 42/85 |
| 4,625,620 A | * | 12/1986 | Harris | 42/94 |
| 4,630,626 A | * | 12/1986 | Urban | 135/84 |
| 4,841,839 A | * | 6/1989 | Stuart | 269/220 |
| 4,947,882 A | * | 8/1990 | Levasseur | 135/77 |
| 4,964,430 A | * | 10/1990 | Janis | 135/67 |
| 5,194,678 A | * | 3/1993 | Kramer | 42/94 |
| 5,307,828 A | * | 5/1994 | Gardner et al. | 135/77 |
| 5,377,710 A | * | 1/1995 | Laser | 135/66 |
| 5,421,115 A | * | 6/1995 | McKay | 248/163.1 |
| 5,711,103 A | * | 1/1998 | Keng | 42/94 |
| 5,713,382 A | * | 2/1998 | Midcap | 135/44 |
| 5,815,974 A | * | 10/1998 | Keng | 42/94 |
| 5,913,668 A | * | 6/1999 | Messer | 42/94 |
| 6,044,747 A | * | 4/2000 | Felts | 42/94 |
| 6,305,116 B1 | * | 10/2001 | Parker | 42/94 |
| 6,324,725 B1 | * | 12/2001 | Green | 16/42 R |
| 6,374,841 B1 | * | 4/2002 | Yamamoto et al. | 135/77 |
| 2002/0074467 A1 | * | 6/2002 | Harris | 248/188.9 |

FOREIGN PATENT DOCUMENTS

| | | |
|---|---|---|
| DE | 2450-835 | 5/1976 |
| SE | 139685 | * 11/1950 |

* cited by examiner

Primary Examiner—Leslie A. Braun
Assistant Examiner—Naschica S. Morrison
(74) Attorney, Agent, or Firm—Harness, Dickey & Pierce, P.L.C.

(57) ABSTRACT

An overboot device is provided for increasing a foot print of a foot portion of a bi-pod firearm support. The overboot preferably comprises a base having a cone projecting therefrom and a cylinder axially extending from the cone. A plurality of fingers axially extend from the cylinder and include a tab radially projecting therefrom. The tabs form a ring which combines with an axially spaced apart annular flange radially projecting from the cone to define a recess therebetween. A removable band nests within the recess so as to constrict the fingers toward one another to reduce the diameter of the cylinder such that the overboot may be secured about the foot portion of the bi-pod assembly.

9 Claims, 1 Drawing Sheet

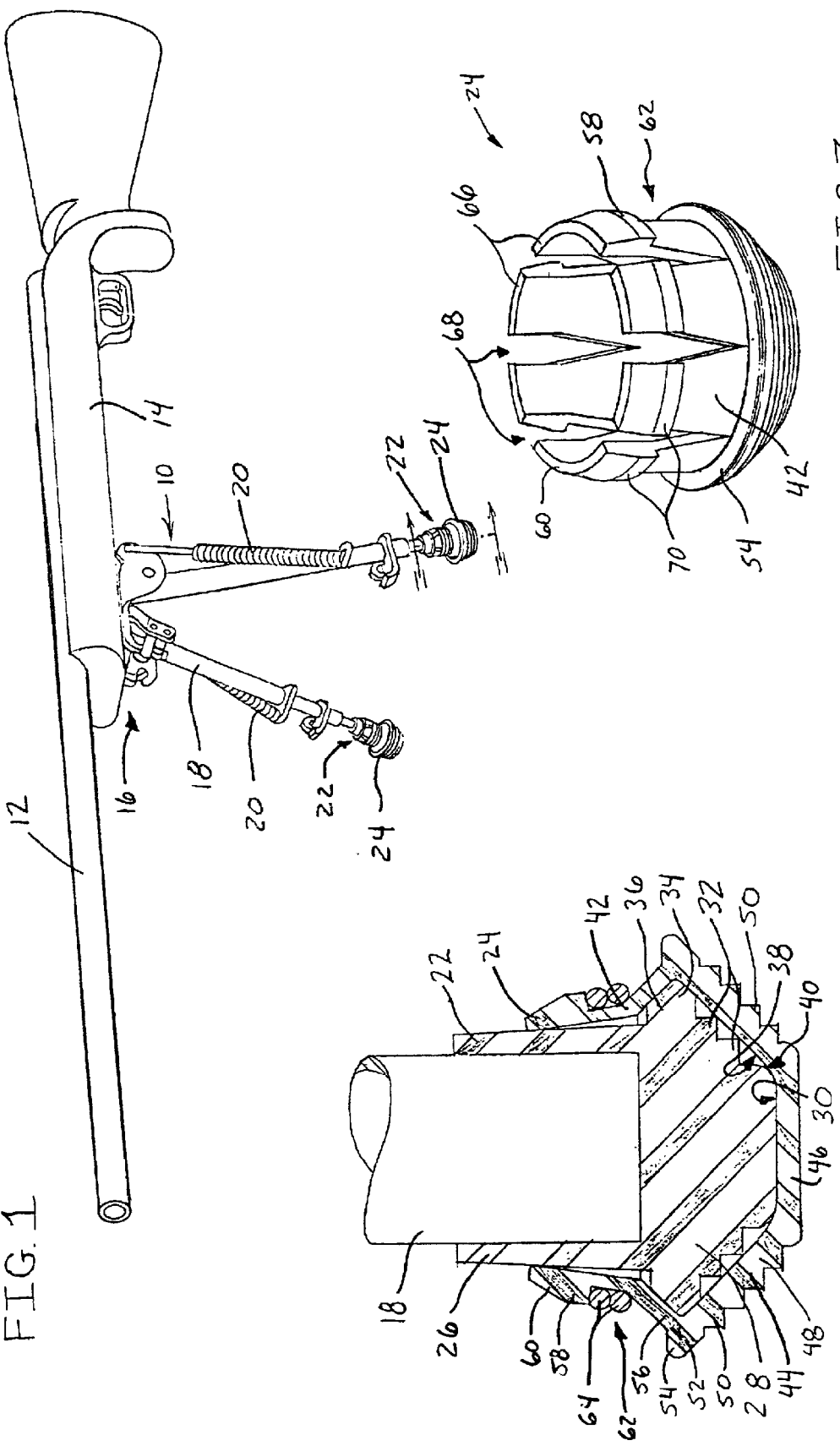

OVERBOOT FOR A BI-POD ADAPTER

This application is a Continuation of Ser. No. 09/094,284 filed Jun. 9, 1998, now abandoned.

BACKGROUND OF THE INVENTION

1. Technical Field

The present invention relates generally to bi-pod mounting assemblies for firearms and, more particularly, to an overboot device for increasing the foot print of the foot portion of the bi-pod assembly so as to prevent the assembly from sinking in snow, mud, and other mire.

2. Discussion

Modern firearms, such as rifles in particular, may be more accurately and conveniently fired by the user if the firearm is equipped with a bi-pod assembly for supporting the barrel. One example of a lightweight, detachable bi-pod assembly with foldable legs is described in my previous patent, U.S. Pat. No. 4,470,216 issued on Sep. 11, 1984, the disclosure of which is incorporated by reference herein.

The '216 patent discloses a bi-pod assembly which is removably attached to the barrel portion of a firearm. The bi-pod assembly is secured to the barrel of the rifle by means of a bi-pod mounting device. Two support legs are coupled to the mounting assembly so that they can be stored in a first position substantially parallel to the barrel and can be moved to a second position substantially perpendicular to the barrel for providing support during shooting. The distal end of each support leg opposite the firearm terminates in a foot portion which includes an enlarged diameter base. The foot portion is formed from rubber so as to provide stable contact with the ground or other substratum on which the bi-pod assembly is supported.

While such a bi-pod assembly of my earlier patent is well adapted for convenient use during non-adverse weather conditions, firearms frequently require use in harsh or hostile environments. When the ground is covered with snow or consists of mud or other mire, the foot portion of the support legs may sink into the substratum. This results in a less stable shooting platform for the user.

In accordance with the present invention, an enlarged cup-like add-on foot portion or overboot is provided for supporting the firearm on unsolid ground. In the preferred embodiment of the present invention, the overboot is removably coupled to a foot portion of a conventional bi-pod assembly. Such an overboot device is a desirable addition to the bi-pod assembly for the purpose of providing a stable shooting platform on an unsolid substratum.

SUMMARY OF THE INVENTION

The above and other objects are provided by an overboot for increasing a foot print of a foot portion of a bi-pod firearm support. The overboot preferably comprises a base having a cone projecting therefrom and a cylinder axially extending from the cone. A plurality of fingers axially extend from the cylinder and include a tab radially projecting therefrom. The tabs form a ring which combines with an axially spaced apart annular flange radially projecting from the cone to define a recess therebetween. A removable band nests within the recess so as to constrict the fingers toward one another to reduce the diameter of the cylinder such that the overboot may be secured about the foot portion of the bi-pod assembly.

BRIEF DESCRIPTION OF THE DRAWINGS

In order to appreciate the manner in which the advantages and objects of the invention are obtained, a more particular description of the invention will be rendered by reference to specific embodiments thereof which are illustrated in the appended drawings. Understanding that these drawings only depict preferred embodiments of the present invention and are not therefore to be considered limiting in scope, the invention will be described and explained with additional specificity and detail through the use of the accompanying drawings in which:

FIG. 1 is a perspective view of firearm having a bi-pod assembly secured thereto including a preferred embodiment of the overboot device according to the present invention;

FIG. 2 is a cross-sectional view of the overboot device and foot portion of the bi-pod assembly of FIG. 1; and FIG. 3 is a perspective view of the overboot device of the present invention.

DETAILED DESCRIPTION OF THE PREFERRED EMBODIMENTS

The present invention is directed towards an overboot device for a foot portion of a bi-pod assembly. The overboot device fits over the foot portion of the bi-pod assembly so as to increase the foot print thereof. As such, the bi-pod assembly is better suited for use on unstable surfaces such as snow, mud, and other mire.

Referring now to the drawing figures, FIG. 1, illustrates a bi-pod device 10 mounted on a rifle 12. The bi-pod device 10 is secured to the stock 14 of the rifle 12 by means of a plate adapter 16. The bi-pod device 10 includes a pair of support legs 18 secured to the plate 16. A pair of springs 20 extend between the plate 16 and the legs 18 for urging the legs 18 towards a position parallel to the stock 14. In the position illustrated, the support legs 18 extend substantially perpendicular to the stock 14 and are held there against the bias of the springs 20 due to an "over-center" configuration thereof. By slightly rotating the support legs 18 towards the stock 14, the over-center condition is eliminated and the legs 18 are rotated parallel to the stock 14 by the springs 20.

Each support leg 18 includes a foot portion 22 at a distal end thereof opposite the rifle 12. An overboot device 24 according to the present invention is secured about each foot portion 22 to increase a foot print of the bi-pod device 10 such that it may support the firearm 12 on unsolid ground.

Referring now to FIG. 2, a cross sectional view of the foot portion 22 and the overboot 24 of FIG. 1 is illustrated. The foot portion 22 includes a cylindrical housing 26 encircling the support leg 18 and terminating at a distal end in an integral conical base 28. The conical base 28 is truncated so as to define a circular end 30. The conical base 28 also includes a plurality of concentric ribs 32 circumferentially extending from a perimeter thereof. The ribs 32 yield a stepped configuration to the cross section of the foot portion 22. The rib 34 farthest spaced apart from the circular end 30 forms an annular flange 36 radially projecting from the cylindrical housing 26 adjacent the conical base 28.

The overboot 24 includes an inner surface 38 complimentary of the outer surface 40 of the foot portion 22. The cup-like overboot 24 generally consists of a cylindrical wall 42 integrally formed with a toroidal base 44. More particularly, the toroidal base 44 is shaped as a truncated cone having a circular base 46 integrally formed with a cone portion 48 projecting therefrom. The cone portion 48 terminates at the integrally formed cylindrical wall 42.

A plurality of concentric ribs 50 radially project from the cone portion 48 of the base 44 between the circular portion 46 and the cylindrical wall 42. The rib 52 farthest spaced apart from the circular portion 46 forms an annular flange 54 radially projecting from the proximal end 56 of the cylindrical wall 42 adjacent the cone portion 48. An annular ring 58 radially projects from the distal end 60 of the cylindrical wall 42 axially spaced apart from the annular flange 54. Together, the annular flange 54 and annular ring 58 define a recess 62 about the perimeter of the cylindrical wall 42.

A band 64 nests within the recess 62 for constricting the cylindrical wall 42 of the overboot 24 about the cylindrical housing 26 of the foot portion 22. Preferably, the band 64 consists of a pliant material such as rubber but may also comprise a non-extensible strap such as a string tied about the cylindrical wall 42. Also, the overboot 24 preferably comprises a flexible material such as rubber or, more preferably, Sanoprene (tradename).

Referring now to FIG. 3, a perspective view of the overboot 24 is illustrated. The cylindrical wall 42 includes a plurality of fingers 66 projecting axially therewith. The fingers 66 are defined by a plurality of triangularly shaped slots 68 formed within the cylindrical wall 42 from the distal end 60. The slots 68 accommodate the constriction of the cylindrical wall 42 by the band 64 described above. Each finger 66 includes a tab 70 radially projecting from an end thereof opposite the annular flange 54. In combination, the plurality of tabs 70 form the annular ring 58 for defining the recess 62 with the flange 54. Although a tab 70 is depicted on each finger 66, one skilled in the art will appreciate that only a select number of fingers 66 need to be provided with a tab 70 to form the ring 58.

Referring now to all of the drawings collectively, in operation, the overboot 24 is slidingly positioned over the outer surface 40 of the foot portion 22 of the bi-pod 10. When the circular end 30 of the foot portion 22 comes into intimate contact with the circular portion 46 of the overboot 24, the overboot 24 is properly positioned relative to the foot portion 22. Thereafter, the band 64, for example, is stretched to a diameter greater than that of the annular flange 54. The band 64 is then slid over the annular flange 54 and nested within the recess 62. Due to the resilient nature of the band 64, the fingers 66 are drawn toward one another as the band 64 returns to its unstretched diameter. As such, the cylindrical wall 42 of the overboot 24 is constricted about the cylindrical housing 26 of the foot portion 22. While constricted, the inner surface 38 of the cylindrical wall 42 fictionally engages the outer surface 40 of the foot portion 22 and overlaps the annular flange 54. This frictional engagement, and the interference with the annular flange 54, prevents removal of the overboot 24 from the foot portion 22 prior to displacement of the band 64.

As should be clear from the foregoing description, the band 64 preferably has a diameter in a relaxed state smaller than the diameter of the constricted wall portion 42. As such, the band 64 continuously urges the cylindrical wall 42 into engagement with the cylindrical housing 26. Alternatively, a non-extensible cord 64 may be wound about the cylindrical wall 42 and drawn tight so as to constrict the fingers 66 about the hosing 26 of the foot portion 22. Thereafter the cord 64 may be tied or otherwise fixed to hold the cylindrical wall 42 in its constricted state.

Thus, the present invention provides an overboot device for increasing the foot print of a foot portion of a bi-pod assembly for supporting a firearm. The overboot device conveniently attaches to the foot portion and may be easily removed therefrom so that its use can be selectively implemented. By increasing the foot print of the foot portion of a bi-pod assembly with the overboot device of the present invention, the firearm can be accurately deployed on snow, mud or other mire. Due to its simplicity of design, the configuration of the inner surface of the overboot may be adapted to compliment any number of conventional foot portion designs.

Those skilled in the art can now appreciate from the foregoing description that the broad teachings of the present invention can be implemented in a variety of forms. For example, the overboot device is not limited to use in conjunction with bi-pod devices for firearms, but may also be used with tri-pod devices such as those commonly used with cameras. Therefore, while this invention has been described in connection with particular examples thereof, the true scope of the invention should not be so limited since other modifications will become apparent to the skilled practitioner upon a study of the drawings, specification, and following claims.

What is claimed is:

1. An overboot in combination with a foot portion of a multi-legged firearm support assembly, the foot portion having an upper portion and a lower portion, the upper portion being generally cylindrical, the lower portion having a shape of a truncated cone, the lower portion having a maximum diameter that is greater than a substantially constant diameter of the upper portion, the overboot comprising:

an upper portion circumferentially surrounding the upper portion of the foot portion;

a floor; and a conical portion interconnecting the floor and the upper portion of the overboot, the conical portion upwardly and outwardly extending from the floor;

whereby the overboot is a thin walled structure constructed of a flexible material that matingly receives the foot portion, and;

wherein the lower portion of the overboot includes a plurality of concentric overboot ribs radially extending between the floor and the upper portion of the overboot, and the truncated cone of the lower portion of the foot portion includes a plurality of concentric foot ribs circumferentially extending therefrom.

2. The combination of claim 1, wherein the concentric overboot ribs and the concentric foot ribs have a generally triangular shape.

3. An overboot in combination with a foot portion of a multi-legged firearm support assembly, the foot portion having an upper portion and a lower portion, the upper portion being generally cylindrical, the lower portion having a shape of a truncated cone and a plurality of concentric foot ribs circumferentially extending therefrom, the lower portion having a maximum diameter that is greater than a substantially constant diameter of the upper portion, the overboot comprising:

a lower portion downwardly terminating at a floor, the floor defining a generally planar lower surface, the lower portion further including a sidewall upwardly and outwardly extending from the floor and mating with the lower portion of the foot portion, the sidewall including a plurality concentric, triangularly shaped overboot ribs radially extending about the lower portion of the overboot;

an upper portion integrally formed with and upwardly extending from the lower portion of the overboot, the upper portion of the overboot circumferentially surrounding the upper portion of the foot portion, the upper portion of the overboot having a significantly smaller diameter than the lower portion of the foot portion, the upper portion of the overboot further including a plurality of slots and fingers to accommodate the foot portion; and a band constricted about the upper portion of the foot portion for securing and holding the overboot in position, the band received into an annular recess circumferentially surrounding the upper portion of the overboot, the annular recess being continuous about the upper portion of the overboot when the upper portion of the overboot is constricted about the upper portion of the foot portion;

whereby the overboot is a thin walled structure constructed of a flexible material that matingly receives the foot portion.

4. The overboot combination of claim 3, wherein the band comprises a pliant strap having a diameter in a relaxed state less than the diameter of the upper portion of the overboot.

5. The overboot combination of claim 3, wherein the band comprises a cord removably tied to the upper portion of the overboot for constriction thereof.

6. The overboot combination of claim 3, wherein the concentric foot ribs provide a stepped configuration to the lower portion of the foot portion.

7. The overboot combination of claim 3, wherein the truncated cone of the lower portion of the foot portion includes a circular end, and a foot rib farthest spaced apart from the circular end forms an annular flange radially projecting from the cylindrical upper portion of the foot portion adjacent the truncated cone.

8. The overboot combination of claim 3, wherein each finger forms a tab radially projecting from an end thereof opposite an annular flange defined by an overboot rib spaced farthest apart from the planar lower surface of the lower portion.

9. The overboot combination of claim 8, wherein the annular recess is defined by the annular flange and an annular ring, the annular ring defined by the plurality of the tabs.

* * * * *